(12) United States Patent
Inoue et al.

(10) Patent No.: US 8,670,607 B2
(45) Date of Patent: Mar. 11, 2014

(54) IMAGE PROCESSING METHOD, IMAGE PROCESSING DEVICE AND RECORDING MEDIUM

(75) Inventors: Akira Inoue, Tokyo (JP); Shinichi Uehara, Kanagawa (JP); Kenichi Takatori, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 525 days.

(21) Appl. No.: 12/921,050

(22) PCT Filed: Mar. 27, 2009

(86) PCT No.: PCT/JP2009/056335
§ 371 (c)(1),
(2), (4) Date: Sep. 3, 2010

(87) PCT Pub. No.: WO2009/123066
PCT Pub. Date: Oct. 8, 2009

(65) Prior Publication Data
US 2011/0002533 A1 Jan. 6, 2011

(30) Foreign Application Priority Data
Apr. 3, 2008 (JP) ................................. 2008-096774

(51) Int. Cl.
*G06K 9/00* (2006.01)
(52) U.S. Cl.
USPC ............... 382/154; 348/47; 352/62; 359/462; 382/167
(58) Field of Classification Search
USPC ............... 382/154, 167; 345/419; 348/47, 48; 352/62, 63; 359/462, 464, 466
See application file for complete search history.

(56) References Cited

U.S. PATENT DOCUMENTS

| | | | | |
|---|---|---|---|---|
| 5,568,314 A * | 10/1996 | Omori et al. | ................... | 359/464 |
| 5,646,641 A * | 7/1997 | Okamura et al. | ................... | 345/8 |
| 6,384,859 B1 * | 5/2002 | Matsumoto et al. | ............ | 348/43 |
| 6,657,602 B2 * | 12/2003 | Endo et al. | ......................... | 345/8 |
| 6,724,325 B2 * | 4/2004 | Fox | ................................ | 341/51 |
| 7,139,053 B2 * | 11/2006 | Yuuki et al. | ................... | 349/114 |

(Continued)

FOREIGN PATENT DOCUMENTS

| | | |
|---|---|---|
| JP | 10-224822 A | 8/1998 |
| JP | 11-511316 A | 9/1999 |
| JP | 2004229881 A | 8/2004 |
| WO | 2004036378 A2 | 4/2004 |

OTHER PUBLICATIONS

International Search Report for PCT/JP2009/056335 mailed Jul. 7 2009.

(Continued)

*Primary Examiner* — Gregory M Desire
(74) *Attorney, Agent, or Firm* — Sughrue Mion, PLLC

(57) ABSTRACT

An image processing method and an image processing device which can improve sharpness by producing a binocular rivalry intentionally are provided. An image processing device 100 includes a right eye image acquiring unit 101 which generates a right eye image by performing a correction processing on an input image, a left eye image acquiring unit 102 which generates a left eye image which produces a binocular rivalry with the right eye image by performing a correction processing which is different from the correction processing, and a multi-eye display unit which displays the right eye image and the left eye images to different viewpoints.

20 Claims, 13 Drawing Sheets

(56) References Cited

U.S. PATENT DOCUMENTS

| | | | |
|---|---|---|---|
| 7,155,048 B2* | 12/2006 | Ohara | 382/132 |
| 7,295,715 B2* | 11/2007 | Jung et al. | 382/254 |
| 7,401,923 B2* | 7/2008 | Fergason | 353/8 |
| 7,508,485 B2* | 3/2009 | Jacobs et al. | 352/62 |
| 7,519,218 B2* | 4/2009 | Takemoto et al. | 382/165 |
| 7,532,224 B2* | 5/2009 | Bannai | 345/633 |
| 7,532,754 B2* | 5/2009 | Fujino | 382/167 |
| 7,876,979 B2* | 1/2011 | Lee et al. | 382/300 |
| 7,894,633 B1* | 2/2011 | Harman | 382/106 |
| 8,208,009 B2* | 6/2012 | Neuman | 348/47 |
| 8,411,936 B2* | 4/2013 | Xiao et al. | 382/162 |
| 2001/0042086 A1* | 11/2001 | Ueda et al. | 707/527 |
| 2003/0214630 A1 | 11/2003 | Winterbotham | |
| 2004/0028285 A1* | 2/2004 | Jung et al. | 382/261 |
| 2004/0032488 A1* | 2/2004 | Harman | 348/51 |
| 2006/0007372 A1* | 1/2006 | Yuuki et al. | 349/96 |
| 2006/0072158 A1* | 4/2006 | Christie | 358/3.01 |
| 2007/0165942 A1* | 7/2007 | Jin et al. | 382/154 |
| 2007/0188602 A1* | 8/2007 | Cowan et al. | 348/53 |
| 2008/0002255 A1* | 1/2008 | Tavor et al. | 359/464 |
| 2008/0095464 A1* | 4/2008 | Goertzen et al. | 382/278 |
| 2008/0151193 A1* | 6/2008 | Reder | 353/7 |
| 2008/0252970 A1* | 10/2008 | Takahashi et al. | 359/462 |
| 2011/0012899 A1* | 1/2011 | Inoue et al. | 345/419 |

OTHER PUBLICATIONS

T. Ogyama et al., "Sensory and Perception handbook", Seishin Snob°, Jun. 30, 2003, pp. 552-555, 744-754.

H Sakata, "Effect of picture element on picture quality (stripe element)" The Institute of Television Engineers of Japan Technical Report, vol. 6, No. 37, Jan. 1983.

A. Inoue et al., "Adaptive Image Sharpening Method Using Edge Sharpness" IEICE Transactions on Information and Systems, vol. E76-D, No. 10, Oct. 1993, pp. 1174-1180.

Extended European Search Report dated Jun. 21, 2013, issued by the European Patent Office in corresponding Application No. 09728149.7.

Krumina et al., SPIE "Estimation of stereovision in conditions of blurring simulation", Jan. 1, 2005, vol. 5946 59461N-10.

Office Action dated Oct. 1, 2013 issued by the Japanese Patent Office in counterpart Japanese Application No. 2010505853.

* cited by examiner

IMAGE PROCESSING METHOD, IMAGE PROCESSING DEVICE AND RECORDING MEDIUM

This application is the National Phase of PCT/JP2009/056335, filed Mar. 27, 2009, which is based upon and claims the benefit of priority from Japanese patent application No. 2008-096774, filed on Apr. 3, 2008, the disclosure of which is incorporated herein in its entirety by reference.

TECHNICAL FIELD

The present invention relates to an image processing method, an image processing device, and a program which improve a display quality in a system that displays different images to a plurality of viewpoints.

BACKGROUND ART

Previously, Patent Document 1, Patent Document 2, and Patent Document 3 disclose a technique of generating and displaying images in which luminance components corresponding to left and right eyes are differ from each other. In Patent Document 1, by setting the luminance of one of left and right images to be relatively higher, and in Patent Documents 2 and 3, by enhancing a contrast of one of the images, a three-dimensional appearance and luster are achieved.

FIG. 18 is a view showing an example of an image processing device of a related art. An image processing device 300 of the related art is composed of a both eye images display unit 301, a right image luminance correcting unit 302, and a left image luminance correcting unit 303. The both eye images display unit 301 includes a right image display unit 304 and a left image display unit 305. An input image signal is input to each of the right image luminance correcting unit 302 and the left image luminance correcting unit 303. The right image luminance correcting unit 302 enhances a light-dark contrast after extracting a luminance Y from the image signal. As an example of a contrast enhancement method, there is a method that applies a first tone curve 51 shown in FIG. 10 to the luminance Y. The left image luminance correcting unit 303 corrects the luminance by using a parameter which is different from that of the right image. As an example of the left image luminance correcting unit 303, there is a method that apples a second tone curve 52 to the luminance Y. The second tone curve 52 has a slope less than that of the first tone curve 51, and has a characteristic that a contrast enhancement effect is low.

The both eye images display unit 301 is a display device which is capable of presenting different images to right and left eyes of a human, and is utilized as a three-dimension display. As an example of the both eye images display unit 301, there is one in which a left and right image projection units are mounted with different polarization filters and an observer observes with both eyes through polarization glasses.

[Patent Document 1]
Japanese Unexamined Patent Application Publication No. 10-224822
[Patent Document 2]
Japanese Unexamined Patent Application Publication No. 2004-229881
[Patent Document 3]
Published Japanese Translation of PCT International Publication for Patent Application, No. 11-511316

DISCLOSURE OF INVENTION

Technical Problem

However, in the related art, there is a problem that the sharpness cannot be enhanced only by correcting the overall contrast of an image. Further, a temporal variation is not utilized, so there is another problem that texture such as luster of an object viewed under reflected light and metallic texture cannot be enhanced.

The present invention has been made to solve the above-mentioned problems, and it is an object of the invention to provide an image display device, an image display method, and a program which improve an image quality by displaying different images to both eyes.

Technical Solution

To solve the above-mentioned problems, an image processing method according to an exemplary aspect of the invention includes the step of performing an image enhancement processing to enhance a predetermined bandwidth of a right eye image displayed to a right eye and a left eye image displayed to a left eye image from an input image. In the step of performing the image enhancement processing, a difference in an amount of enhancement between the right eye image and the left eye image is equal to or more than a perceptible limit (hereinafter, referred to also as "enhancement difference").

An image display method according to another exemplary aspect of the invention includes the step of using a right eye image displayed to a right eye as an input image to generate a left image displayed to a left eye by performing black and white reversal or color reversal of the input image.

Advantageous Effects

According to the present invention, an image processing method, an image processing device, and a program which can improve sharpness can be provided.

EXPLANATION OF REFERENCE 1, 11, 21 MULTI-VIEW IMAGE DISPLAY UNIT
2 RIGHT EYE IMAGE LUMINANCE CORRECTION UNIT
3 LEFT EYE IMAGE LUMINANCE CORRECTION UNIT
4, 13 RIGHT EYE BANDWIDTH ENHANCEMENT UNIT
5, 14 LEFT EYE BANDWIDTH ENHANCEMENT UNIT
6, 17, 25 RIGHT EYE IMAGE DISPLAY UNIT
7, 18, 26 LEFT EYE IMAGE DISPLAY UNIT
8, 18, 26 ATTENTION AREA SPECIFY UNIT
9, 10, 24, 29 DISPARITY GENERATION UNIT
15 RIGHT EYE ENHANCEMENT AMOUNT TIME SERIES VARIATION UNIT
16 LEFT EYE ENHANCEMENT AMOUNT TIME SERIES VARIATION UNIT
22 BLACK AND WHITE REVERSAL UNIT
27 COLOR REVERSAL UNIT
31 BAND PASS FILTER CHARACTERISTIC
42 LIQUID CRYSTAL PANEL
43, 44 IMAGE BUFFER
45 MULTI-VIEW DISPLAY UNIT
51, 52 TONE CURVE
61 HIGH-FREQUENCY FILTER
71 ATTENTION AREA
72 PORTRAIT IMAGE
81 BLACK AND WHITE REVERSAL TONE CURVE
100, 110, 120, 130 IMAGE PROCESSING DEVICE
101 RIGHT EYE CORRECTION PROCESSING UNIT
102 LEFT EYE CORRECTION PROCESSING UNIT

BEST MODE FOR CARRYING OUT THE INVENTION

First Exemplary Embodiment

Figure 1:
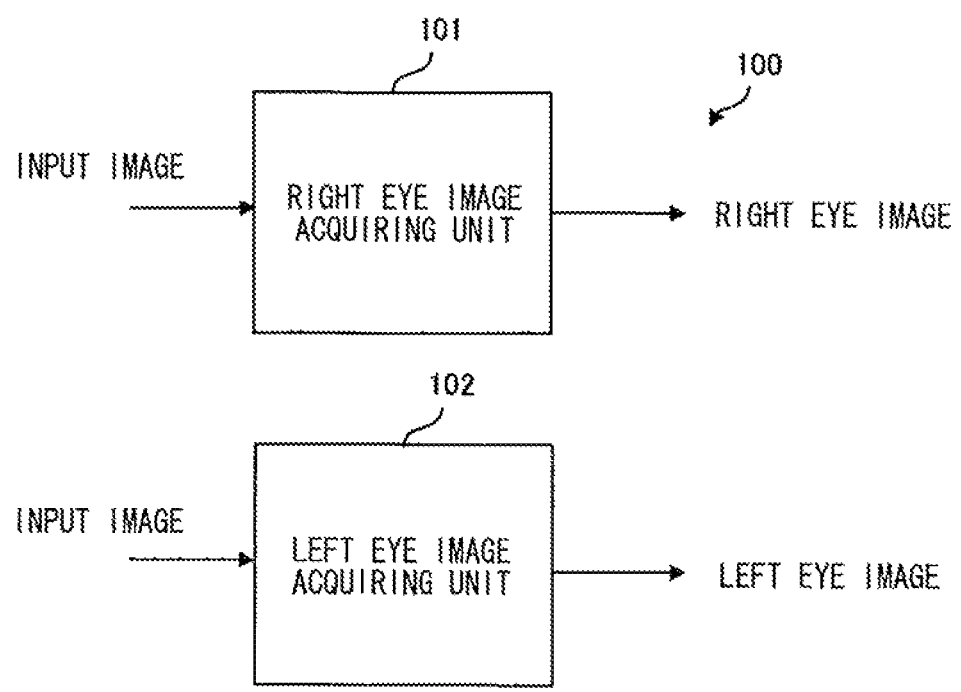
FIG. 1 is a block diagram showing an image processing device of a first exemplary embodiment of the present invention.

Hereinafter exemplary embodiments will be explained in detail with reference to the drawings. FIG. 1 is a view showing an image processing device 100 of a first exemplary embodiment of the present invention. The image processing device 100 includes a right eye image acquiring unit 101 which acquires a right eye image displayed to a right eye (a first viewpoint) from an input image, and a left eye image acquiring unit 102 which acquires a left eye image displayed to a left eye (a second viewpoint) from the input image. The right eye image acquiring unit 101 or the right eye image acquiring unit 101 and the left eye image acquiring unit 102 perform an image enhancement processing of a predetermined bandwidth of the input image. The difference of an amount of enhancement between a right eye image and a left eye image (enhancement difference) is equal to or more than a perceptible limit. The input image may be either a still image or a dynamic (moving) image.

The present exemplary embodiment, by performing the image enhancement processing on the left and right images with a different amount of enhancement, produces binocular rivalry, improves a contrast, and aims at improvement of an image quality. Here, only the right eye image acquiring unit 101 can perform a bandwidth enhancement processing, or both of the right eye image acquiring unit 101 and the left eye image acquiring unit 102 perform a bandwidth enhancement processing vary the amount of enhancement in the bandwidth enhancement processing. In this case, as described later, it is preferred that the difference in the amount of the enhancement between a right eye image and a left eye image is equal to or more than 0.1, each amount of enhancement is from –0.1 to 0.1. Further, the amount of the enhancement of the bandwidth enhancement processing can be fluctuated over time. Furthermore, as described later, instead of the bandwidth enhancement processing, a black and white reversal processing or a color reversal processing can be performed on either a right eye image processing unit or a left eye image processing unit.

Further, the bandwidth enhancement processing, the black and white reversal, or the color reversal can be performed only on an attention area specified in the input image. By specifying the attention area, an area which produces a binocular rivalry can be restricted. Therefore attention of viewer can be focused on the specific area. Further, a disparity in a horizontal direction can be added to one of the input images. By this, a disparity image (three-dimensional image) of which image quality is more improved can be acquired. Furthermore, after performing a bandwidth enhancement processing of the input image, the right eye image and the left eye image can be acquired by performing a luminance correction which emphasizes a contrast. This improves the image quality more.

Second Exemplary Embodiment

Next, a second exemplary embodiment of the present invention will be explained. The present exemplary embodiment is an example in which a bandwidth enhancement processing is performed as a correction processing to produce a binocular rivalry. At first, in an image processing device of the present exemplary embodiment, a principle changing texture and improving an image quality will be explained. According to a document edited by Ooyama, Imai, Waki, titled "Sensory and Perceptual Psychology handbook", Seishin shobou, pp. 744-754 (non-patent document 1), when different images are displayed to left and light eyes, in the brain, these, images are synthesized and perceived. The perceptual condition is not stable, so one of the images may be seen dominantly, or the images of both eyes may be seen alternately. This phenomenon is called a binocular rivalry in psychology of vision.

Further, when there is little difference between luminance values of the both eyes, it is known that there is an effect of improving a contrast sensitivity which is called binocular summation. When this instability of vision in the both eyes is utilized, a binocular rivalry is produced in a partial area of the image in which a spatial frequency band to be emphasized is dominant by strongly performing bandwidth enhancement to one of left and light images. At the same time, in an area having a small luminance difference, a contrast feeling due to the binocular summation is increased. By this effect, texture such as light reflex occurring on an object and luster can be evoked in the brain. Further, by generating the disparity between both eyes, in stereoscopic vision, the above image quality improving effect can also be given.

Figure 2:
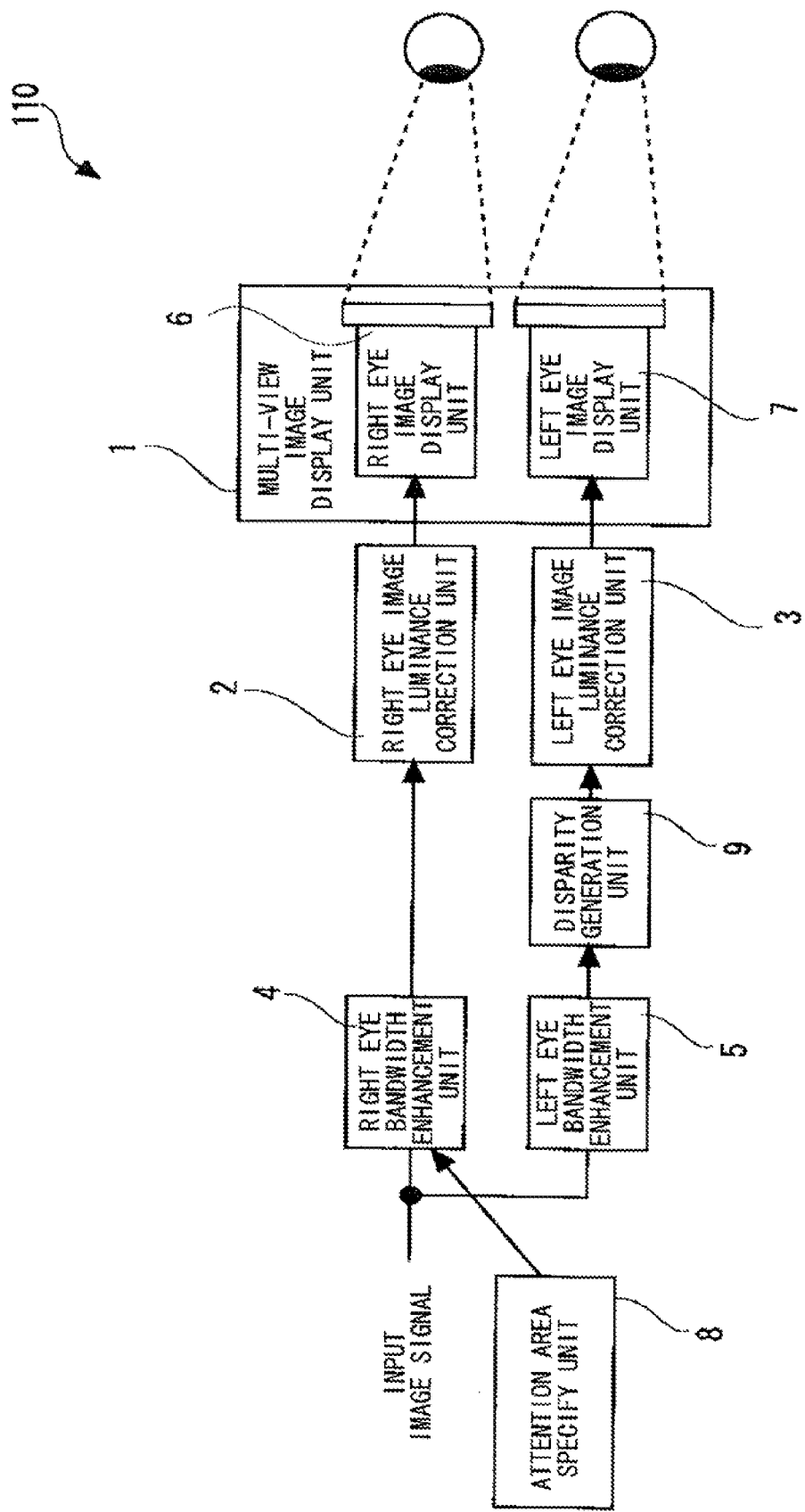
FIG. 2 is a block diagram showing an image processing device of a second exemplary embodiment of the present invention.

Next, the second exemplary embodiment of the present invention will be explained in detail with reference to the drawings. FIG. 2 is a block diagram showing an image processing device of the second exemplary embodiment of the present invention. As shown in FIG. 2, an image processing device 110 includes a multi-view image display unit 1, a right eye image luminance correction unit 2, a left eye image luminance correction unit 3, a right eye bandwidth enhancement unit 4, a left eye bandwidth enhancement unit 5, an attention area specify unit 8, and a disparity generation unit 9. The multi-view image display unit 1 includes a right eye image display unit 6 and a left eye image display unit 7.

An input image signal is input to each of the right eye bandwidth enhancement unit 4 and the left eye bandwidth enhancement unit 5. Note that the second exemplary embodiment has a constitution which distributes the same input signal, however, image data which is preliminarily replicated to the same input image can be used as an input of the right eye bandwidth enhancement unit and left eye bandwidth enhancement unit.

The right eye bandwidth enhancement unit 4 emphasizes or suppresses the spatial frequency band which is sensitive to a sharpness of vision for the input image, and generates a right eye bandwidth enhancement image. The left eye bandwidth enhancement unit 5 has the same constitution as the right eye bandwidth enhancement unit 4, but the amount of enhancement is different. Specifically, the left eye bandwidth enhancement unit 5 performs the image enhancement processing by using the amount of enhancement k which is different from that of the right eye bandwidth enhancement unit 4, and generates a left eye bandwidth enhancement image whose amount of enhancement is different from the right eye bandwidth enhancement image. This improves a contrast and image quality.

One example of the right eye bandwidth enhancement unit 4 is a method for enhancement using a linear filter shown in Expression (1). Y(x, y) represents a luminance value at the coordinate (x, y) of one frame of an original image.

$$Y(x,y) = Y(x,y) + R(Y(x,y) \otimes BPF)$$

$\otimes$: convolution operation k of Expression (1) is the amount of enhancement. When k becomes greater from zero, a sharpness is increased, and when k becomes less from zero, a sharpness is decreased. BPF is a band pass filter which passes a band component which is sensitive to a sharpness of vision.

Figure 3:
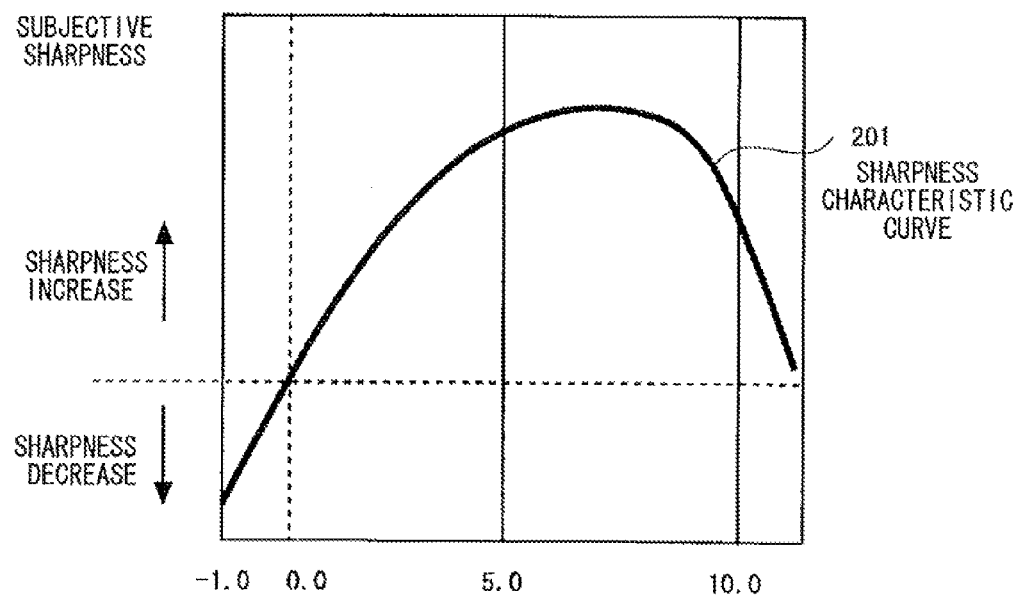
FIG. 3 is an explanation view showing a relationship between an amount of enhancement k and sharpness.

An optimal value of the amount of enhancement k for increasing the sharpness is decided depending on a shape of BPF or design of an image. However, in a status of normal utilization, when the sharpness is increased, it is desirable that the value of the amount of enhancement k has the difference which is equal to or more than 0.1 experimentally to perceive the difference of the sharpness. When the difference of k (the enhancement difference) becomes less than 0.1, it is difficult to determine the difference of the sharpness. A limiting point where the difference of the sharpness can be discriminated is called a perceptible limit. Although as k becomes greater, the sharpness is increased, if k is more than a predetermined level, a black and white border appears near an edge due to excess enhancement, and thus the image looks like not a photographed image but a pictorial image. FIG. 3 is a view showing the relationship between the amount of enhancement k and the sharpness.

A sharpness characteristic curve 201 becomes greater in proportion to the amount of enhancement until a predetermined amount is reached. However the enhancement is excessive, the sharpness is no longer perceived, and the sharpness decreases to the contrary. Although the amount of enhancement depends on the shape of BPF or design of the image, the upper limit of the enhancement amount k is empirically about ten. That is, when the amount of enhancement of one of the images is zero (when the image enhancement processing is not performed), it is preferred that the amount of enhancement of the other enhancement processing is $0.1 \leq k \leq 10$.

To decrease the sharpness, it is necessary to reduce the amount of enhancement less than zero. At that time, a so-called blurred image is output. To experimentally make a person perceive the decrease in sharpness, it is preferred that the amount of enhancement is equal to or less than $-0.1$. Note that the lower limit of k when the sharpness is decreased is $-1.0$, which indicates a case where all band components are subtracted. When k is set to the value which is less than $-1.0$, an image effect that is unpredictable to the eye is produced. That is, when one of the amounts of enhancement is set to zero and the other sharpness is decreased, it is preferred that the amount of enhancement is $-1.0 \leq k \leq -0.1$. When the right eye bandwidth enhancement unit 4 and the left eye bandwidth enhancement unit 5 perform the bandwidth enhancement processing at the same time, it is preferred that both of the amounts of enhancement are in the range of $-0.1$ to $10$, and the difference in the amount of enhancement (difference enhancement) is in the range of $0.1$ to $10$.

Figure 4:
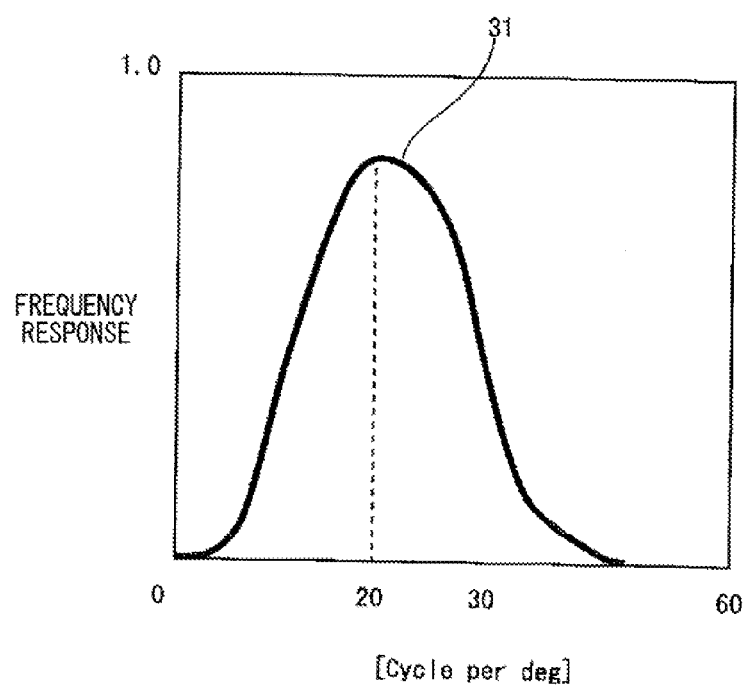
FIG. 4 is a view showing an example of band pass filter characteristics.

As one example of the band pass characteristics of a BPF (band pass filter), FIG. 4 shows a band pass filter characteristic 31. The band pass filter characteristic 31 shows a smooth linear filter which has a peak near 20 cycle per deg [cpd]. Methods which use a filter having similar characteristics and emphasize the sharpness of an image are described in Sakata, "Effect of picture element on picture quality (stripe element) (vision and image quality)", The Institute of Television Engineers of Japan Technical Report, Vol. 6, No. 37, 1983 (non-patent document 2), A. Inoue and J. Tajima, "Adaptive Image Sharpening Method Using Edge Sharpness," Vol. E76-D, No. 10, pp. 1174-1180, 1993 (non-patent document 3), and so on. In fact, it is possible to use a space filter having a peak near 10-50 cpd and a filter characteristic which is continuous and smooth. There is a DOG (Difference-Of-Gaussian) filter as the following expression (2) as one of examples of BPF.

$$DOG(x, y) = C_1 \exp\left(\frac{x^2 + y^2}{2\pi\sigma_1^2}\right) - C_2 \exp\left(\frac{x^2 + y^2}{2\pi\sigma_2^2}\right)$$

C1 and C2 are constants. This filter is expressed by a difference of a Gaussian filter, and parameters are $\sigma_1$, $\sigma_2$. By changing the values of parameters, a pass band can be changed. Examples of specific numerical numbers are $\sigma_1=2.0$, $\sigma_2=1.0$. The parameter $\sigma_1$ is a value which controls a rising edge of a low-frequency wave side, and has an effect that emphasizes a larger edge by increasing the value. The parameter $\sigma_2$ is a value which controls a cutoff of a high-frequency wave side, and has an effect of noise suppression at the time of emphasis.

Optimal values for the parameters $\sigma 1$, $\sigma 2$ differ from each other depending on a resolution or design of an image. In a case of digital image data which is currently generally used in SDTV, HDTV, digital camera photos, and so on, it is preferred that the value of σ1 is in the range of 0.1 to 5.0, and the value of σ2 is in the range of 0.0 to 1.0.

Figure 5:
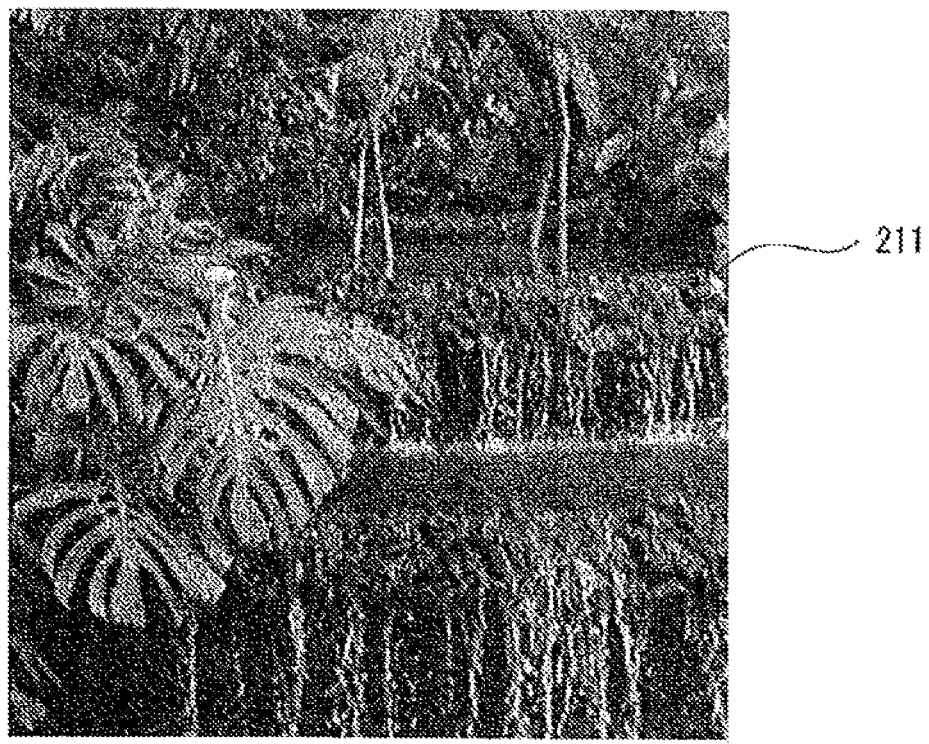
FIG. 5 is a view showing an image processing example by using Expression (2), and showing an original image example.
Figure 6:
FIG. 6 is a view showing an image processing example by using Expression (2), and showing an example of deterioration in sharpness.
Figure 7:
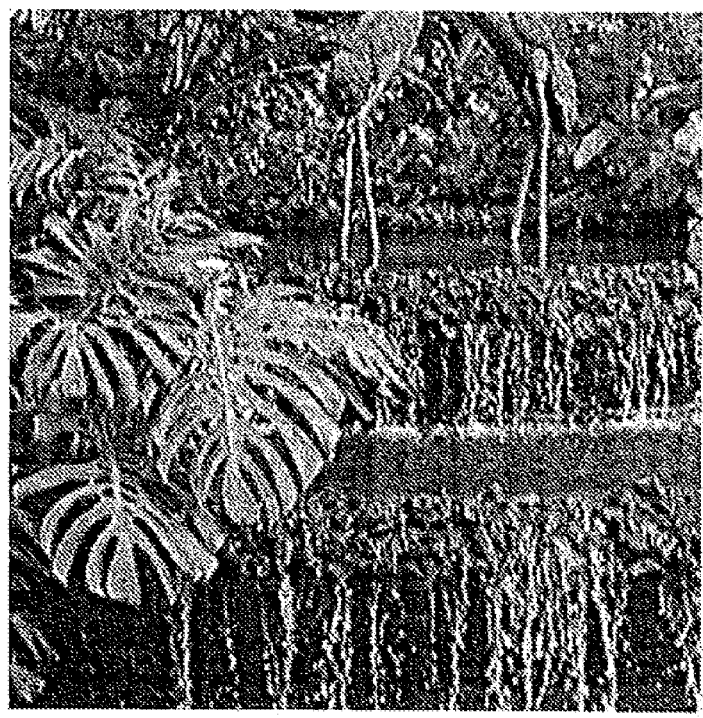
FIG. 7 is a view showing an image processing example by using Expression (2), and showing an example of an image whose sharpness is enhanced.
Figures 8, 9:
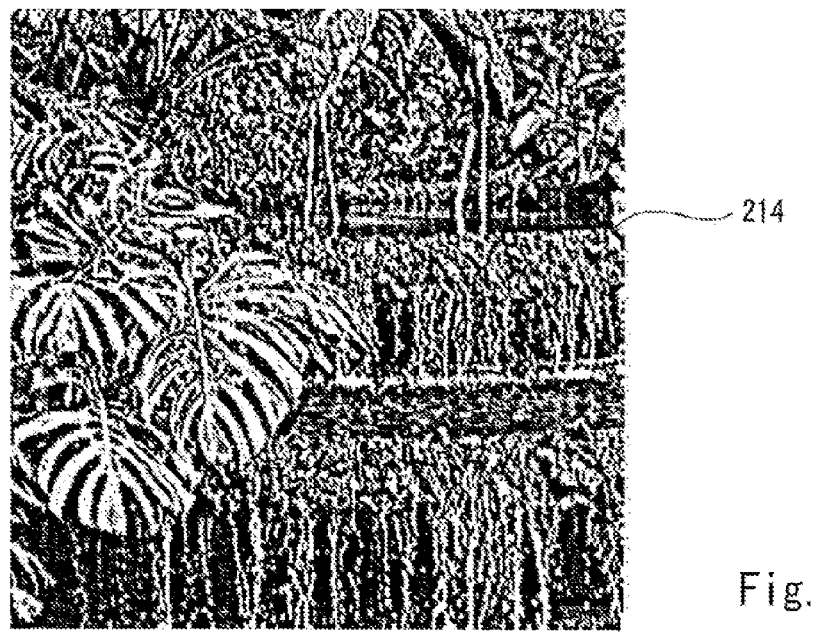
FIG. 8 is a view showing an image processing example by using Expression (2), and showing an example of excess enhancement of sharpness.
FIG. 9 is a view showing a high-frequency filter which is one of an example of BPF.

FIGS. 5-8 are examples of image processing by using the express (2). The parameters are $\sigma_1=2.0$, $\sigma_2=0.3$. FIG. 5 shows an example of an original image 211, FIG. 6 shows an example 212 of deterioration in sharpness, FIG. 7 shows an example 213 of image enhancement of sharpness, and FIG. 8 shows an example 214 of excess enhancement of sharpness. Note that, as an example of BPF which reduces the amount of operation, a simple high-frequency filter 61 shown in FIG. 9 can be used. The filter has the characteristic which passes a high frequency having a the bandwidth which is sensitive to the sharpness, or greater.

The above-mentioned bandwidth enhancement processing is aimed at a processing for a luminance signal Y. When color image signals RGB are input, it is general that after separating the signals into the luminance Y signal and a color-difference UV signal, the bandwidth enhancement processing is performed only on the luminance Y signal. This is because the amount of operation is reduced. However, if R, G, and B are processed independently, the same effect can be achieved. Therefore, the bandwidth enhancement processing is performed on R, G, and B independently.

Next, the image processing device 110 makes the disparity generation unit 9 act on an output of the left eye bandwidth enhancement unit 5. The disparity generation unit 9 adds a disparity in the horizontal direction only to one image to implement stereovision. Specifically, the disparity generation unit 9 performs a processing to make each pixel move in parallel in accordance with a depth of each pixel of the image. For example, an object X can be displayed as if it stands out in front of the screen by setting an amount of movement of an object which is located for away to zero and by displaying, the image which is acquired by making an area pixel of an adjacent object X moved by d in the horizontal direction and the right eye bandwidth enhancement image, to the both eyes. Note that, in the present exemplary embodiment, the disparity generation unit 9 is arranged next to the left eye bandwidth enhancement unit 5, however, the disparity generation unit 9 can also be arranged next to the right eye bandwidth enhancement unit 4. Further, when the stereovision is not performed, an amount of disparity movement is set to zero. Note that, if an input image signal includes disparity information, the disparity generation unit 9 is not necessary.

Figure 10:
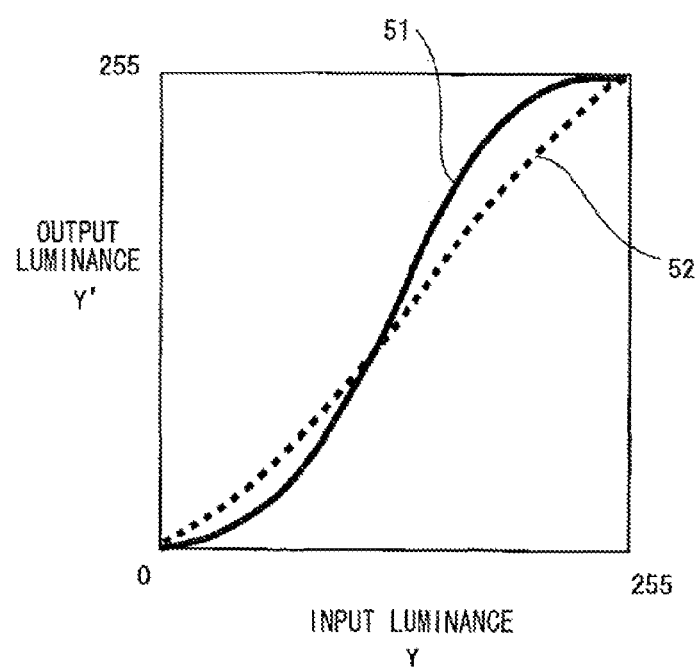
FIG. 10 is a graph showing a first tone curve.

The right eye image luminance correction unit 2 enhances a light-dark contrast and acquires the right eye display image after extracting the luminance Y from an output image signal of the right eye bandwidth enhancement unit 4. As an example of a contrast enhancement method, there is a method for applying a first tone curve 51 shown in FIG. 10 to the luminance Y. The left eye image luminance correction unit 3 corrects the luminance of an output image signal of the left eye bandwidth enhancement unit 5 by using a parameter which is different from that of the right eye display image. As an example of the left eye image luminance correction unit 3, there is a method for applying a second tone curve 52 to the luminance Y. The second tone curve 52 has characteristics that the slope is smaller than the first tone curve 51 and a contrast enhancement effect is less. The right eye image luminance correction unit 2 operates in the same manner as the right eye image luminance correction unit 202 of the prior method, and the left eye image luminance correction unit 3 operates in the same manner as the left eye image luminance correction unit 203 of the prior method. However, in the luminance correction unit of the present exemplary embodiment, even if the luminance correction is not performed in an extreme case, a constant image quality improvement effect is achieved because there is a bandwidth enhancement of former stage.

The multi-view image display unit 1 is a display device which can display different images to different viewpoints, and consists of the right image display unit 6 which displays a right eye display image and the left image display unit 7 which displays a left eye display image. The multi-view image display unit 1 can display a right eye image and a left eye image to left and right eyes, respectively. Therefore, in many cases, the multi-view image display unit 1 is used as a 3D display. As an example of the multi-view image display unit 1, there is an image display in which a right eye image projection unit and a left eye image projection unit are mounted with different polarized filters, and an observer observes with both eyes through polarized glasses.

Figure 11:
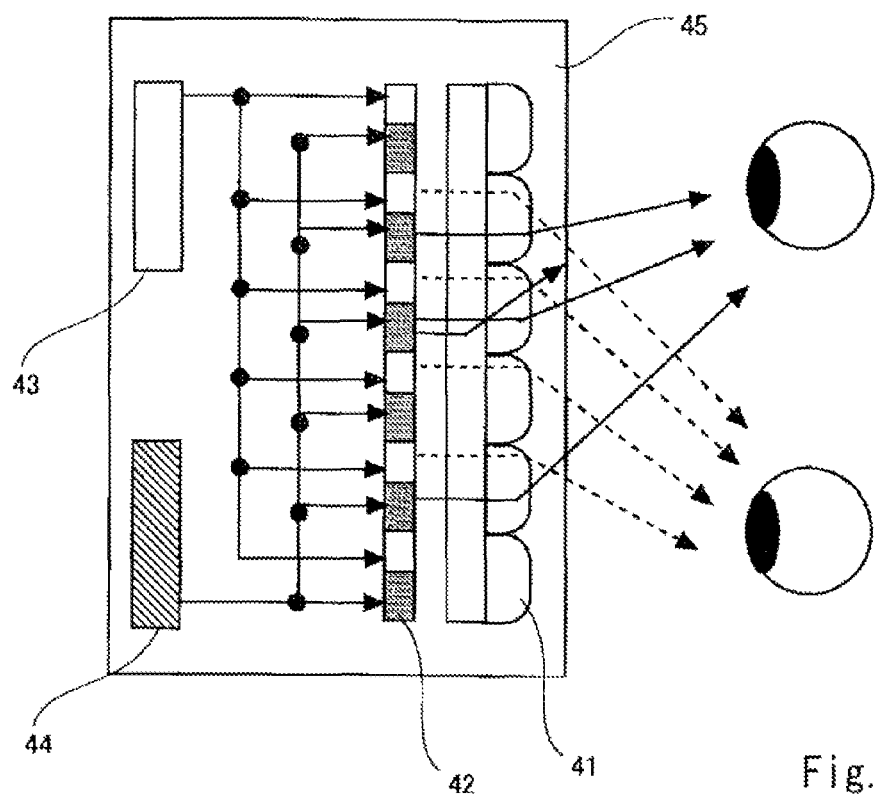
FIG. 11 is a view showing a multi-eye display unit using lenticular lenses.

Further, as another example of the multi-view image display unit 1, there is a multi-view display unit 45 which uses lenticular lenses shown in FIG. 11. The multi-view display 45 is provided with the lenticular lenses which are arranged abreast in a front of a liquid crystal panel 42. Images corresponding the respective viewpoints are accumulated in a right eye image buffer 43 and a right eye bandwidth enhancement unit 44. In the liquid crystal panel 42, strips of a right eye image and strips of a left eye image are combined alternately and displayed in accordance with the size of the lenticular lenses. Since a light pass is bent by the lenticular lenses, images which correspond to a right eye and a left eye of a human and images which correspond to a plurality of viewpoints can be displayed.

FIG. 11 shows one example of a multi-view image display, but a multi-view image display is not limited to this. Examples of an eyeglass system includes an anaglyph system which uses color filters of different colors to left and right eyes, a system which develops an anaglyph system and uses different three areas for each of the left and right eyes with dividing a wavelength area of visible light into six pieces, and a system which puts glasses corresponding to eyes into a permeation state with dividing the images respectively corresponding to left and right eyes in a time axis direction and with displaying them in turn by using liquid-crystal shutter glasses (stereo shutter glasses).

Further, Example of a naked-eye method include a barrier system which limits light which reaches each of the left and right eyes by using a parallax barrier, and a scan back light system which controls an image entering the eye and a light direction by time-sharing by displaying the images corresponding to the left and right eyes by time-sharing on a display device, switching a way of entering light in the right direction and left direction by time-sharing, and using a lens together. Furthermore, as another system, there is a viewer system which displays an image corresponding to each eye on each display device by arraying the display devices in a near-eye system in which the display devices corresponding to the eyes are arranged in front of the eyes in the form of a head mount display or the like.

The present exemplary embodiment can be preferably applied to these varieties of systems of multi-view display units. This is because, in the image processing method according to the present exemplary embodiment, the generated images allow recognition of multi-view information by being processed as needed in accordance with various systems of multi-view display units and being observed through a multi-view display unit.

Figure 12:
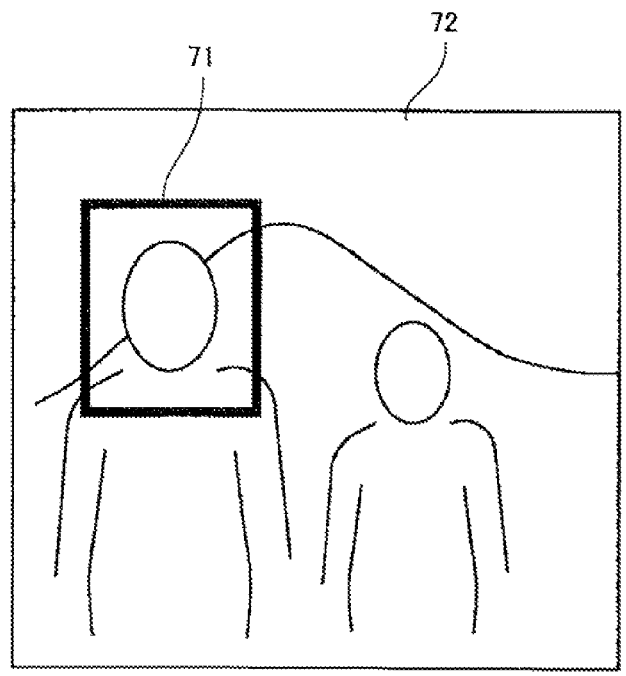
FIG. 12 is a view showing an example of an attention area.

The attention area specify unit 8 specifies partial area to be paid attention to by a viewer from an image. An example of an attention area is shown in FIG. 12. FIG. 12 shows a portrait image 72, and an area surrounded by a rectangle in the image is an attention area 71. In this case, a face area of the person on the front side is specified. A product area in an advertisement image, in addition to the face area of a portrait, is regarded as an attention area. As a method for specifying an area, there is a method for specifying an area by using an input device such as a mouse. Further, there is a method which detects an attention area from each image frame automatically by using an image-recognition technique. Note that this attention area specify unit 8 can be provided as needed.

Figure 13:
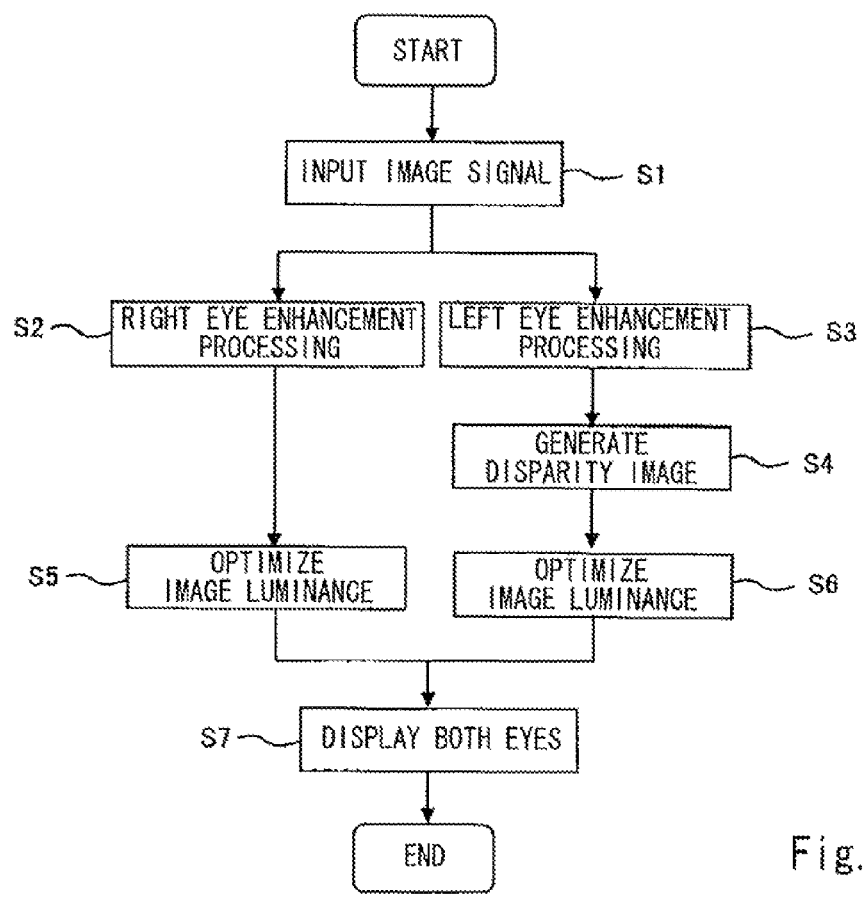
FIG. 13 is a flow chart showing an operation of the image processing device of the second exemplary embodiment of the present invention.

Next, an operation of the image processing device of the present exemplary embodiment will be explained. FIG. 13 is a flow chart showing an operation of the image processing device of the present exemplary embodiment. As shown in FIG. 13, at first, an image signal is input. In the present exemplary embodiment, although a dynamic image is input, a still image can be processed in the same way.

An image signal is input to the right eye bandwidth enhancement unit 4 and the left eye bandwidth enhancement unit 5. The image signal input to the right eye bandwidth enhancement unit 4 is subjected to an image enhancement processing with a predetermined amount of enhancement k1 (step S2), and is supplied to the right eye image luminance correction unit 2. On the other hand, the image signal input to the left eye bandwidth enhancement unit 5 is subjected to an image enhancement processing with an amount of enhancement k2 which is different from the amount of enhancement k1 by 0.1 or more (step S3). It is preferred that the amounts of enhancement k1, k2 are in the range of −0.1 to 10; and the absolute value of the difference of both (enhancement difference) is in the range of 0.1 to 10.

Next, the signal which is subjected to the image enhancement processing by the left eye bandwidth enhancement unit 5 is input to the disparity generation unit 9 and is converted to a disparity image (step S4). After that, the signal is input to the left eye image luminance correction unit 3. Then, the luminance of the images is optimized in the right eye image luminance correction unit 2 and the left eye image luminance correction unit 3, respectively (steps S5, S6). Then, as described above, a right eye image and a left eye images are displayed in the multi-view image display unit 1 (step S7).

In the present exemplary embodiment, the feeling of sharpness can be increased by increasing a high-frequency band component for the image of one viewpoint and producing a binocular rivalry intentionally by a bandwidth enhancement unit. Further, since the area which produces a binocular rivalry can be limited by specifying an attention area, an attention of viewer can be focused on a specific area.

Third Exemplary Embodiment

Figure 14:
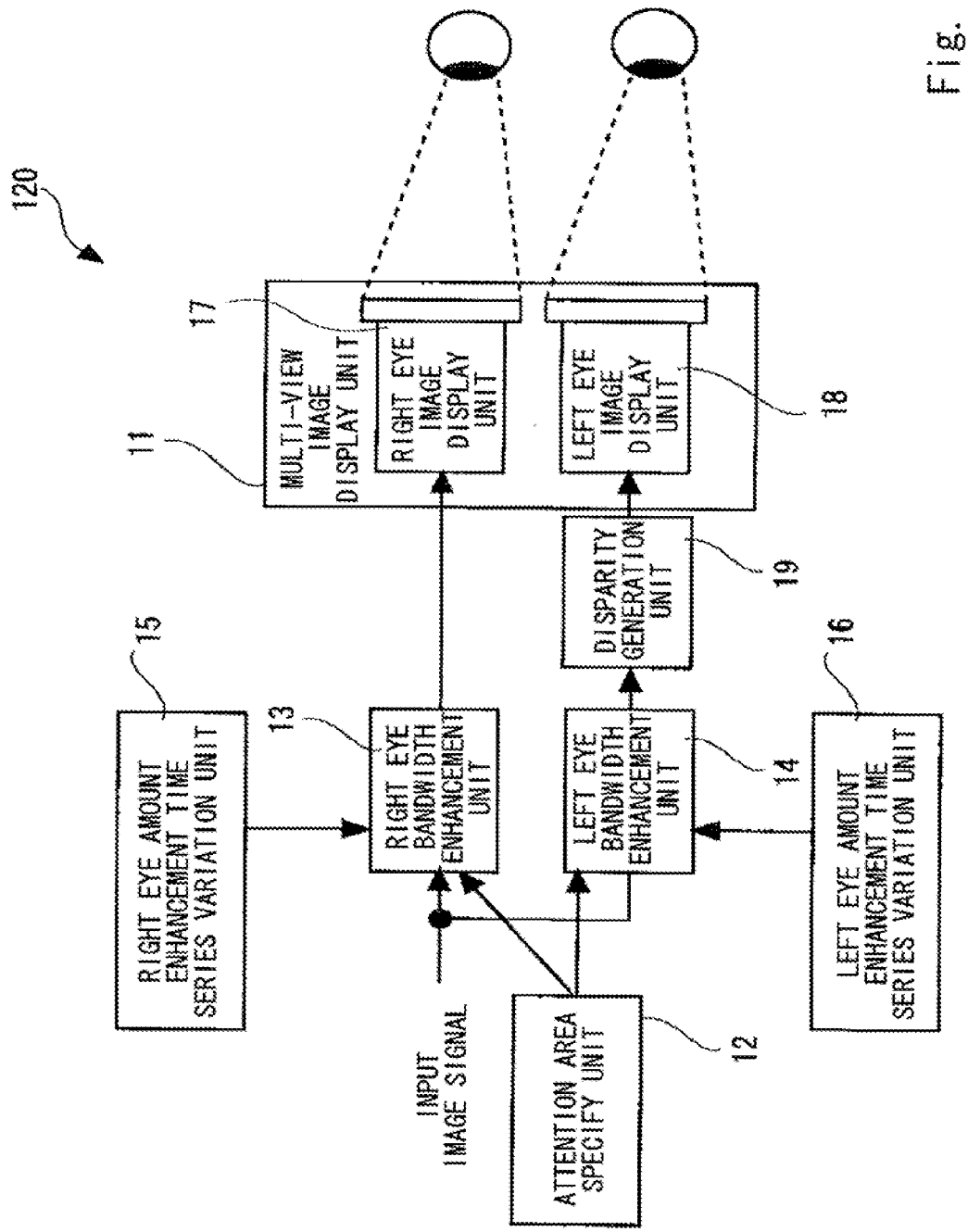
FIG. 14 is a block diagram showing an image processing device of a third exemplary embodiment of the present invention.

Next, a third exemplary embodiment of the present invention will be explained in detail with reference to the drawings. The present exemplary embodiment is an example in which the amount of enhancement is varied in time series in a bandwidth enhancement processing of the first exemplary embodiment. FIG. 14 is a block diagram showing an image processing device of a third exemplary embodiment of the present invention. As shown in FIG. 14, an image processing device 120 of the third exemplary embodiment includes a multi-view image display unit 11, a right eye bandwidth enhancement unit 13, a left eye bandwidth enhancement unit 14, a right eye enhancement amount time series fluctuation unit 15, a left eye enhancement amount time series fluctuation unit 16, an attention area specify unit 12, and a disparity generation unit 19. The multi-view image display unit 11 includes a right image display unit 17 and a left image display unit 18.

An image signal input is input to each of the right eye bandwidth enhancement unit 13 and the left eye bandwidth enhancement unit 14. The right eye bandwidth enhancement unit 13 and the left eye bandwidth enhancement unit 14 perform a bandwidth enhancement processing on an input image frame. As an example, the right eye bandwidth enhancement unit 4 or the left eye bandwidth enhancement unit 5 can be used. The right eye bandwidth enhancement unit 13 performs the bandwidth enhancement processing by using an amount of right eye enhancement which is calculated by the right eye enhancement amount time series variation unit 15. The left eye bandwidth enhancement unit 14 performs the bandwidth enhancement processing by using an amount of left eye enhancement which is calculated by the left eye enhancement amount time series variation unit 16.

The right eye enhancement amount time series variation unit 15 outputs an amount of enhancement which varies in accordance with a predetermined rule. An example of operations of the right eye amount of enhancement time series variation unit 15 and the left eye enhancement amount time series variation unit 16 is shown. N number of amounts of enhancement $F(n)$ ($n=1 \ldots N$) are stored in the right eye amount of enhancement time series variation unit 15. N number of amounts of enhancement $G(n)$ ($n=1 \ldots N$) are stored in the left eye enhancement amount time series variation unit 16. As one example of calculation of right eye and left eye amounts of enhancement at a time t, there are $T1(t)$, $T2(t)$ of Expression (3).

$$T1(t)=F((t\%N)+1)$$

$$T2(t)=G((t\%N)+1) \qquad (3)$$

A symbol % of the expression (3) represents a remainder. In the expression (3), predetermined N number of amounts of enhancement are applied in series in accordance with the time t. Further, if it is applied to a dynamic image, the amount of enhancement can be switched in a plurality of frames. For example, assuming that $N=12$, $F(n)=\{1, 1, 1, 1, 3, 3, 3, 3, 10, 10, 10, 10\}$, the amount of enhancement can be switched to 1, 3, 10 in four frames. Furthermore, as an example in which one of the left and right amounts of enhancement is fixed, there are $T1(t)$, $T2(t)$ of Expression (4).

$$T1(t)=F(1)$$

$$T2(t)=F((t\%N)+1) \qquad (4)$$

Expression (4) shows that the amount of enhancement $T1(t)$ of a right eye bandwidth enhancement image is fixed, and the amount of enhancement $T2(t)$ of a left eye bandwidth enhancement image is switched in series from the first to Nth. Assuming $N=2$, on the side of the second amount of enhancement $T2(t)$, two amounts of enhancement are switched in series. In Expression (4), the amount of enhancement of the right eye bandwidth enhancement image is fixed. On the contrary, the left eye T2 side may be fixed and an image of the right eye T1 side may be enhanced.

Next, the disparity generation unit 19 is caused to operate on an output of the left eye bandwidth enhancement unit 14. The disparity generation unit 19 adds a disparity in the horizontal direction only to one image to perform stereovision, and operates in the same manner as the disparity generation unit 9. Note that, when the input image signal includes disparity information, the disparity generation unit 19 is not necessary.

An output of the disparity generation unit 19 and an output of the right eye bandwidth enhancement unit 13 are input to the multi-view image display unit 11. The multi-view image display unit 11 is a display device which can show different images to different viewpoint positions and consists of the right image display unit 17 which displays a right eye display image and the left image display unit 18 which displays a left eye display image. The multi-view image display unit 11 operates the same manner as the multi-view image display unit 1 of the first exemplary embodiment.

The attention area specify unit 12 is a block which specifies a partial area to be paid attention to by the viewer from the image, and is a block which operates in the same manner as the attention area specify unit 8. The attention area which has been specified is input to two bandwidth enhancement units and the bandwidth enhancement units perform a bandwidth enhancement processing only within the attention area.

A principle of changing a texture and improving image quality according to the present exemplary embodiment will be explained. According to a document edited by Ooyama, Imai, Waki, titled "Sensory and Perceptual Psychology handbook", Seishin shobou, pp. 552-555 (non-patent document 4), when different images are alternately presented to a human in the range of about 2 to 50 Hz, he/she feels flicker. Usually, since this flicker causes uncomfortable feeling, a measure for suppressing peaks of this frequency band is taken. However, to express the shining of an object such as glitter on the water surface, metallic luster, metallic texture, and astronomical scintillation, it is necessary to present frames which vary over time.

If a time change frame is displayed in monocular vision of the prior art, flicker is caused, which may lead to deterioration in image quality. However, when only one of images is processed by a multi-eye display system, both of the images are combined, which reduces perceived flicker. In this way, texture such as the shining of an object, and luster can be evoked in a brain by presenting N frames of images to be changed. Further, in stereovision, the above image quality improvement effect can be achieved by generating a disparity between both eyes.

In the present exemplary embodiment, the same effect as the first exemplary embodiment can be achieved and texture such as the luster of an object can be reproduced by changing one of eye images over time and producing a binocular rivalry intentionally.

Forth Exemplary Embodiment

Figure 15:
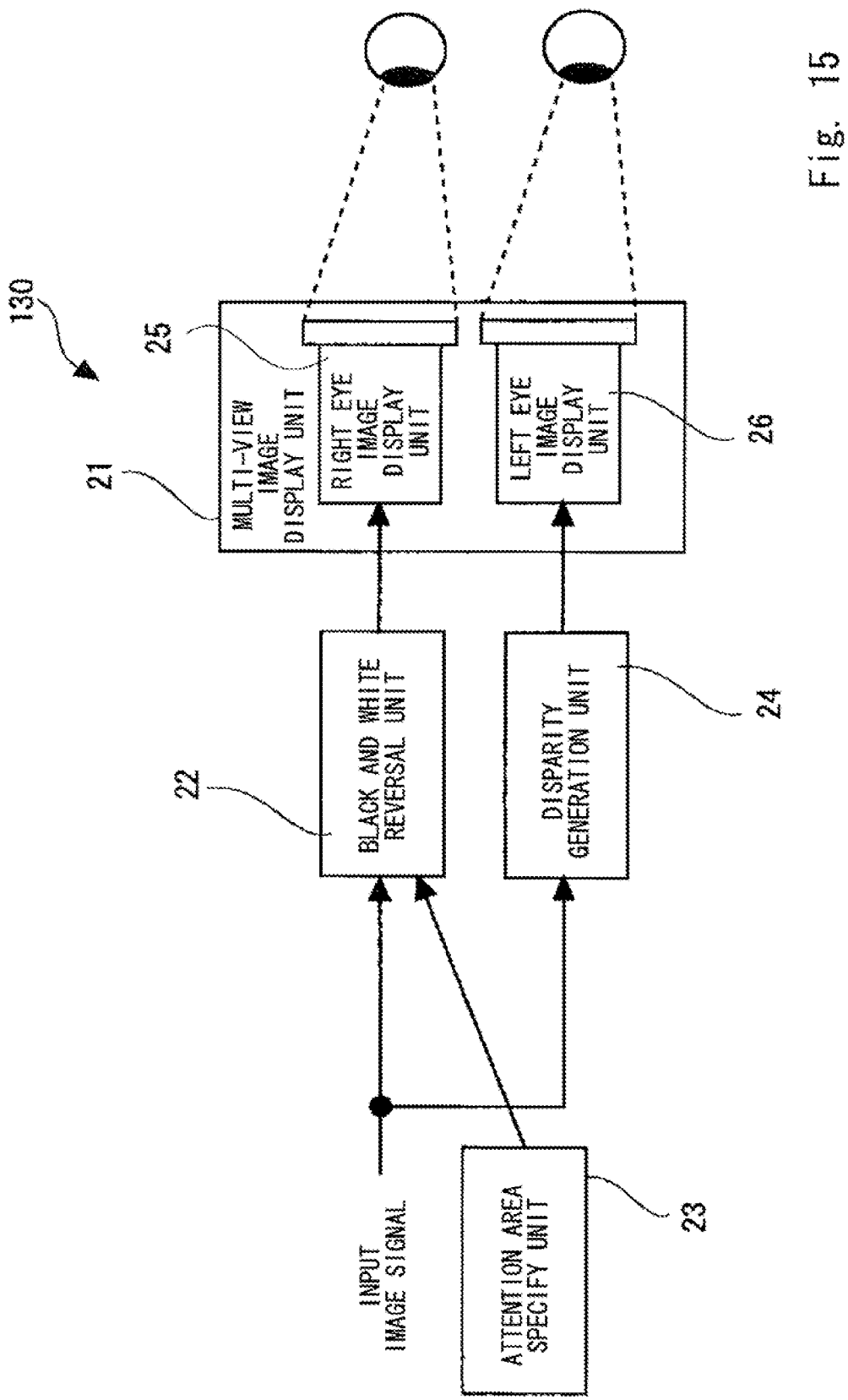
FIG. 15 is a block diagram showing an image processing device of a forth exemplary embodiment of the present invention.

Next, a fourth exemplary embodiment of the present invention will be explained in detail with reference to the drawings. The present exemplary embodiment is an example in which a black and white reversal process is performed as a correction processing to produce a binocular rivalry. FIG. 15 is a block diagram showing an image processing device of the fourth exemplary embodiment. As shown in FIG. 15, an image processing device 130 of the fourth exemplary embodiment includes a multi-view image display unit 21, a black and white reversal unit 22, an attention area specify unit 23, and a disparity generation unit 24. The multi-view image display unit 21 includes a right image display unit 25 and a left image display unit 26. The black and white reversal unit 22 inverts only a luminance signal of an input image signal.

First, an input image signal is separated into a luminance signal and a color signal. Next, a black and white reversal tone curve correction is performed only on the luminance signal. As one example of this black and white tone curve correction, there is a method which converts luminance values by using a black and white reversal curve 81 of FIG. 16. The black and white reversal tone curve 81 is a downward-sloping curve in which, when an input luminance Y=255 (white), an output luminance Y'=0 (black). After the black and white reversal tone curve correction, the input image signal can be converted into a color image signal in which only the luminance is reversed by using an original color signal.

As another example of the black and white reversal unit 22, Expression (5) is applied to the luminance signal Y. Assume that the luminance signal Y is an 8-bit signal in the range of 0 to 255. As Expression (5), a black and white reversal can be performed by subtracting a current signal from a maximum luminance value.

$$Y'=255-Y \tag{5}$$

Next, the input image signal obtained before the black and white reversal processing is performed is branched and applied by the disparity generation unit 24. The disparity generation unit 24 is a block which adds a disparity in the horizontal direction only to one image to perform stereovision and operates in the same manner as the disparity generation unit 9. Note that, in the present exemplary embodiment, although the disparity generation unit is applied to an image other than an image which reverse a black and white, in contrast, the disparity generation unit can be employed with respect to the image in which black and white are reversed. If the input image signal includes disparity information, the disparity generation unit 24 is not necessary.

Output image signals of the black and white reversal unit 22 and the disparity generation unit 24 are input to the multi-view image display unit 21. The multi-view image display unit 21 is a display device which can present different images to different viewpoint positions, and consists of the right image display unit 25 which displays a right display image and the left image display unit 26 which displays a left display image. The multi-view image display unit 21 operates in the same manner as the multi-view image display unit 1 of the first exemplary embodiment.

The attention area specify unit 23 is a block which specifies a partial area to be paid attention to by the viewer from the image, and operates in the same manner as the attention area specify unit 8. The attention area which has been specified is input to the black and white reversal unit 22 and the black and white reversal unit 22 performs a black and white reversal only within the attention area.

The principle of changing the texture according to the present exemplary embodiment will be explained. When performing a black and white reversal of luminance values on the image, we sometimes feel that a material of an object photographed is changed to be transparent. Therefore, the binocular rivalry between the original image, the material of which is changed, and a latter image can be produced by performing a black and white reversal only on one image which corresponds to one viewpoint. The transparency of the object can be increased and the texture can be changed by producing the binocular rivalry intentionally by performing the black and white reversal. By applying this processing only to a product area of an advertisement image of a product, for example, a quality of appearance can be improved and an eye-catching effect can be achieved.

Fifth Exemplary Embodiment

Figure 17:
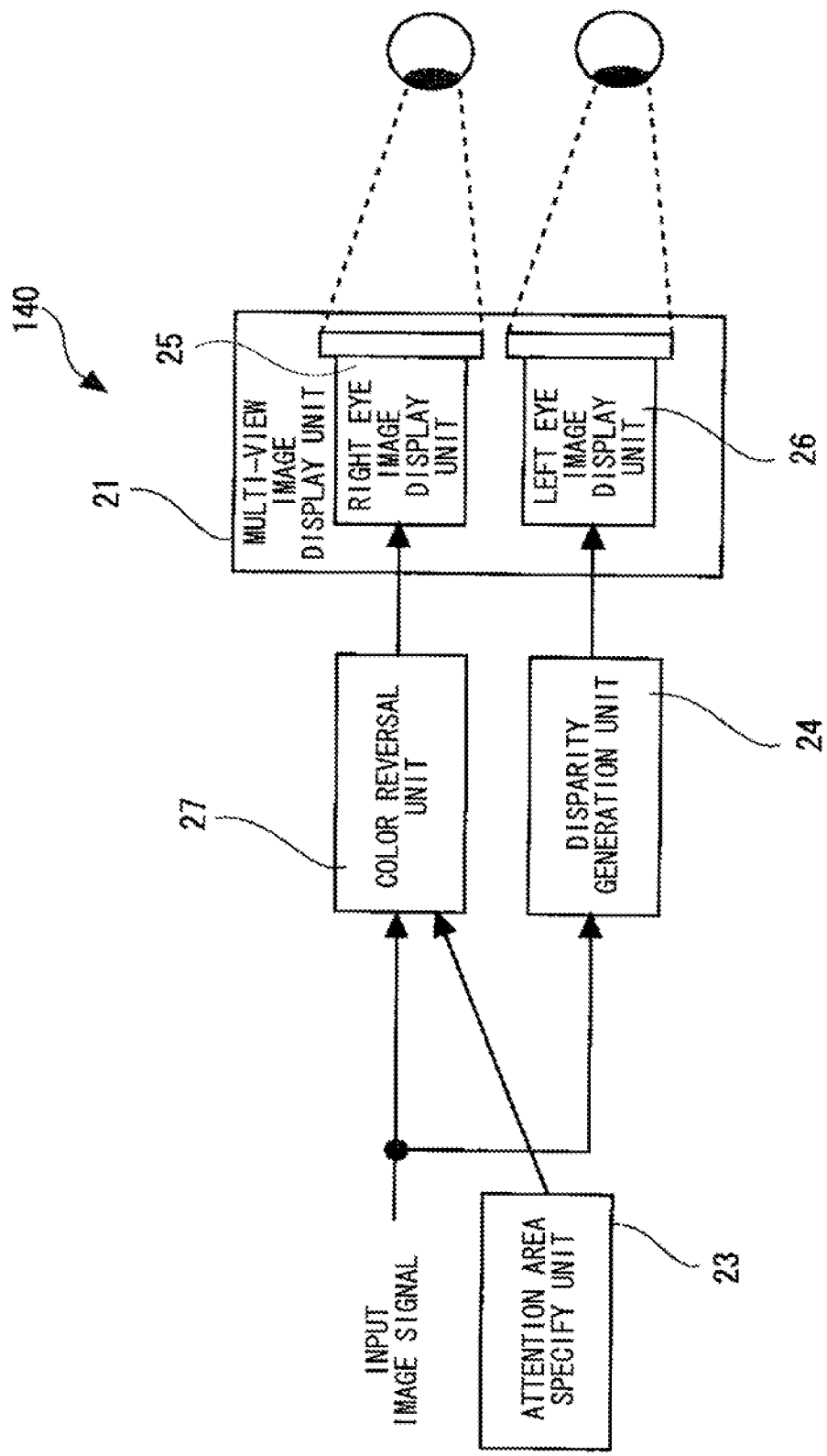
FIG. 17 is a block diagram showing an image processing device of a fifth exemplary embodiment of the present invention.
Figure 18:
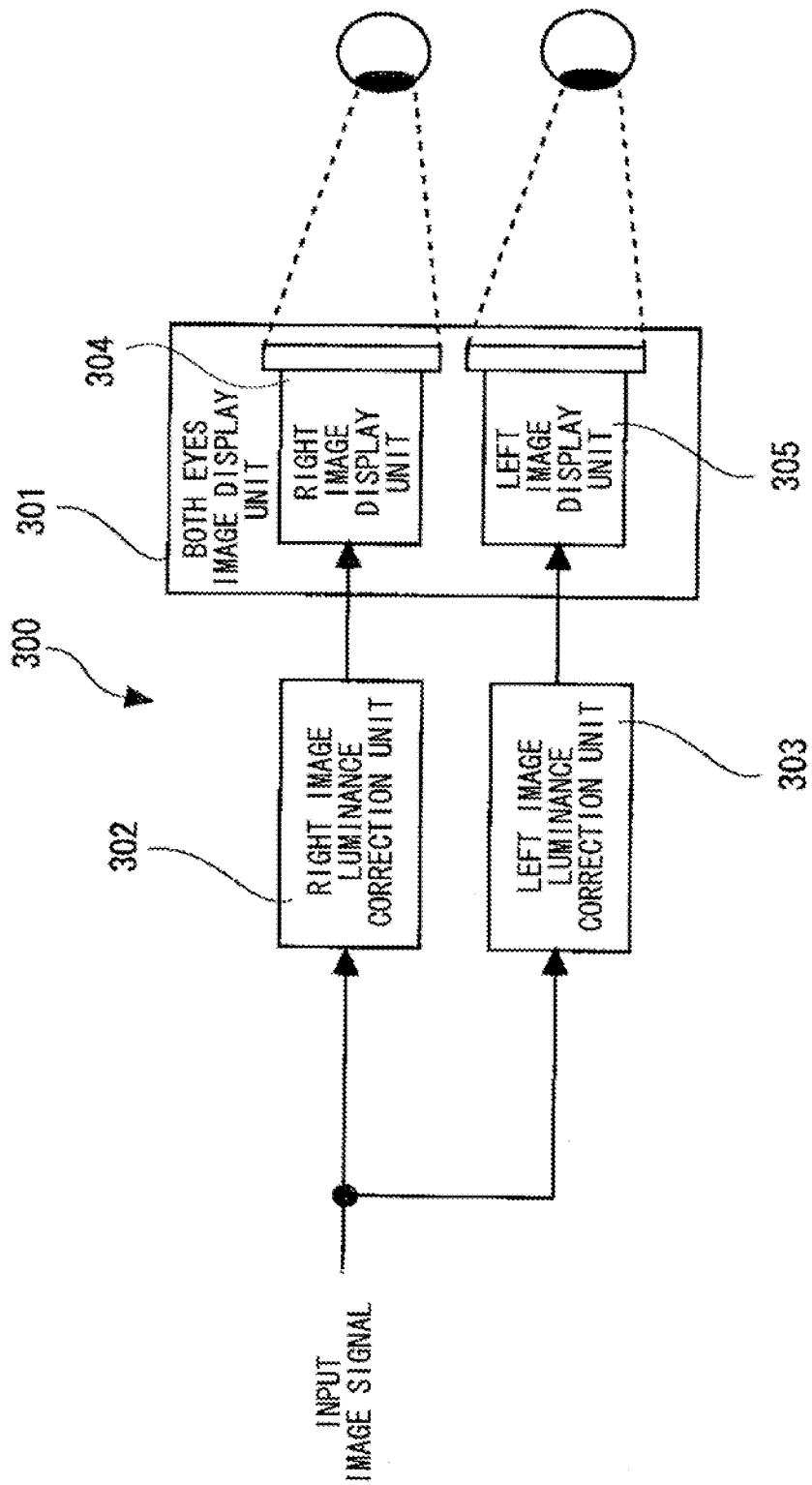
FIG. 18 is a view showing an example of an image processing device of a related art.

Next, a fifth exemplary embodiment of the present invention will be explained in detail with reference to the drawings. Referring to FIG. 17, the fifth exemplary embodiment of the present invention consists of a multi-view image display unit 21, a color reversal unit 27, an attention area specify unit 23, and a disparity generation unit 24. The multi-view image display unit 21 includes a right image display unit 25 and a left image display unit 26.

The color reversal unit 27 is a means which reverses an input image signal including color information. As one example of the color reversal unit 27, there is a method in which R, G, and B are reversed independently with respect to input image signals RGB. As one example of reversing method, there is a method in which Expression (6) is applied to RGB signals. Herein assume that each of the RGB signals is an 8-bit signal in the range of 0 to 255. As Expression (6), a color reversal can be performed by subtracting current signals from the maximum value independently.

$$R' = 255 - R$$

$$G' = 255 - G$$

$$B' = 255 - B \quad (6)$$

As another example of the color reversal unit 27, there is a method in which the signal is reversed after being converted to a luminance color-difference signal. The input signals RGB are separated into to YUV which are luminance color-difference signals. As the luminance color-difference signals, for example, YCbCr which is standardized by ITU-R BT.601 can be utilized. The interconversion between RGB and YCbCr is well known. Y represents a luminance signal and Cb and Cr represent color-difference. As one example of the color reverse method, as shown in Expression (7), there is a method in which Y, Cb, and Cr are reversed independently.

$$Y' = 255 - Y$$

$$Cb' = 255 - Cb$$

$$Cr' = 255 - Cr \quad (7)$$

Figure 16:
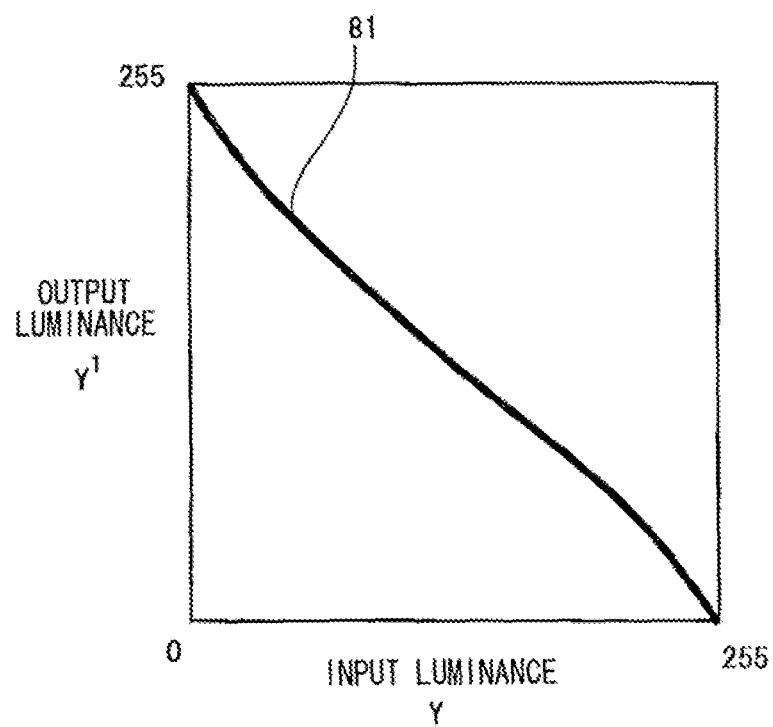
FIG. 16 is a graph showing a black and white reversal tone curve.

Note that, as the processing of reversing signals, a tone curve correction as in the black and white reversal tone curve 81 of FIG. 16 can be applied.

Next, the input image signal obtained before a color reversal processing is performed is branched and applied by the disparity generation unit 24. The disparity generation unit 24 is a block which adds disparity in the horizontal direction to only one image to perform stereovision and operates in the same manner as the disparity generation unit 9. Note that, in the present exemplary embodiment, although the disparity generation unit is applied to an image other than an image to be subjected to the color reversal. On the contrary, the disparity generation unit can be applied to the image to be subjected to the color reversal. If the input image signal includes disparity information, the disparity generation unit 24 is not necessary.

Output signals of the color reversal unit 27 and the disparity generation unit 24 are input to the multi-view image display unit 21. The multi-view image display unit 21 is a display device which can present different images to different viewpoint positions, and consists of the right image display unit 25 which displays a right display image and the left image display unit 26 which displays a left display image. The multi-view image display unit 21 operates in the same manner as the multi-view image display unit 1 of the first exemplary embodiment.

The attention area specify unit 23 is a block which specifies a partial area to be paid attention to by the viewer from the image, and operates in the same, manner as the attention area specify unit 8. The attention area which is specified has been input to the color reversal unit 27 and the color reversal unit 27 performs a color reversal on only the attention area.

The principle of changing the texture according to the present exemplary embodiment will be explained. When performing a color reversal of luminance values on the image, we sometimes feel that a material of an object photographed is changed to be transparent. Therefore, the binocular rivalry between the original image, the material of which is changed, and a latter image can be produced by performing a color reversal only on one image which corresponds to one viewpoint. This can impart transparency to the surface of objects. By applying this processing only to a product area of an advertisement image of a product, a quality of appearance can be improved and an eye-catching effect can be achieved.

For example, the exemplary embodiments have been explained above as a hardware construction, but the present invention is not limited to this, and arbitrary processing can be achieved by causing a CPU (Central Processing Unit) to execute a computer program. In this case, the computer program can be provided by recording it in a recording medium and also can be provided by transmitting it through the Internet or other transmission media.

Although the present invention is explained with reference to the exemplary embodiments, the present invention is not limited to the above. The constructions and details of the present invention can be changed variously in scope of the invention which can be understood by one of ordinary skill in the art.

INDUSTRIAL APPLICABILITY

The present invention can be applied to an image processing method, an image processing device, and a program which can improve an image quality in a system which displays different images to difference viewpoint positions.

The invention claimed is:

1. An image processing method comprising the steps of:
acquiring, by a right eye image acquiring means, a right eye image displayed to a right eye from an input image;
acquiring, by a left eye image acquiring means, a left eye image displayed to a left eye from the input image;
performing an image enhancement processing, by the right eye image acquiring means and/or the left eye image acquiring means, to enhance or de-enhance a predetermined bandwidth of the input image,
wherein, in the step of performing the image enhancement processing, a difference in an amount of enhancement between the right eye image and the left eye image is equal to or more than a perceptible limit, the perceptible limit being a limiting point where a difference of sharpness can be discriminated by perception, and the amount of enhancement is fluctuated with time.

2. The image processing method according to claim 1, wherein the difference in the amount of enhancement between the right eye image and the left eye image is equal to or more than 0.1.

3. The image processing method according to claim 2, wherein the difference in the amount of enhancement between the right eye image and the left eye image is equal to or less than 10.

4. The image processing method according to claim 3, wherein the amount of enhancement between the right eye image and the left eye image is varied to produce binocular rivalry in the image enhancement processing.

5. The image processing method according to claim 1, wherein, the step of image enhancement uses a filter indicated as follows, when $C_1$, $C_2$ are constants, $\sigma_1$ is a parameter in a range from 0.5 to 5.0, and $\sigma_2$ is a parameter in a range from 0.0 to 1.0, $$DOG(x, y) = C_1 \exp\left(\frac{x^2 + y^2}{2\pi\sigma_1^2}\right) - C_2 \exp\left(\frac{x^2 + y^2}{2\pi\sigma_2^2}\right).$$

6. The image processing method according to claim 1, wherein an attention area specifying means that specifies an attention area in the input image performs the bandwidth enhancement processing or a black and white reversal only on the attention area.

7. The image processing method according to claim 1, wherein a disparity in a horizontal direction is added to the one input image.

8. The image processing method according to claim 1, wherein after performing the bandwidth enhancement processing of the input image, the right eye image and the left eye image are acquired by performing a luminance correction which enhances a contrast.

9. An image processing device comprising:
a right eye image acquiring means that acquires a right eye image displayed to a right eye from an input image; and
a left eye image acquiring means that acquires a left eye image displayed to a left eye from the input image,
wherein the right eye image acquiring means and/or the left eye image acquiring means perform an enhancement processing to enhance or de-enhance a predetermined bandwidth of the input image, and a difference in an amount of enhancement between the right eye image and the left eye image is set to be equal to or more than a perceptible limit, the perceptible limit being a limiting point where a difference of sharpness can be discriminated by perception, and the amount of enhancement of the bandwidth enhancement processing is fluctuated with time.

10. The image processing device according to claim 9, wherein the difference in the amount of enhancement between the right eye image and the left eye image is equal to or more than 0.1.

11. The image processing device according to claim 10, wherein the difference in the amount of enhancement between the right eye image and the left eye image is equal to or less than 10.

12. The image processing device according to claim 11, wherein the right eye image acquiring means and the left eye image acquiring means make the amount of enhancement between the right eye image and the left eye image vary to produce binocular rivalry.

13. The image processing device according to claim 9, wherein the right eye image acquiring means and the left eye image acquiring means use a filter indicated as follows, when $C_1$, $C_2$ are constants, $\sigma_1$ is a parameter in a range from 0.5 to 5.0, and $\sigma_2$ is a parameter in a range from 0.0 to 1.0, $$DOG(x, y) = C_1 \exp\left(\frac{x^2 + y^2}{2\pi\sigma_1^2}\right) - C_2 \exp\left(\frac{x^2 + y^2}{2\pi\sigma_2^2}\right).$$

14. The image processing device according to claim 9 further comprising:
an attention area specifying means that specifies an attention area in the input image,
wherein the attention area specifying means performs the bandwidth enhancement processing or a black and white reversal only on the attention area.

15. The image processing device according to claim 9 further comprising:
a disparity generation means that adds a disparity in a horizontal direction to the one input image.

16. The image processing device according to claim 9, wherein the right eye image acquiring means and the left eye image acquiring means perform a luminance correction which enhances a contrast to acquire the right eye image and the left eye image, after performing a bandwidth enhancement processing of the input image.

17. An image processing method comprising the steps of:
acquiring, by one of a right eye image acquiring means and a left eye image acquiring means, an input image as a display image; and
acquiring, by the other of the right eye image acquiring means and the left eye image acquiring means, a display image by performing black and white reversal or color reversal of the input image that is acquired by the one of the right eye image acquiring means and the left eye image acquiring means.

18. An image processing device comprising:
a right eye image acquiring means that acquires a display image for a right eye to be displayed to the right eye, from an input image; and
a left eye image acquiring means that acquires a display image for a left eye to be displayed to the left eye, from the input image,
wherein one of the right eye image acquiring means and the left eye image acquiring means acquires the input image as the display image for the right eye or the left eye, respectively, and the other of the right eye image acquiring means and the left eye image acquiring means performs black and white reversal or color reversal of the input image to acquire a display image for the right eye or left eye, respectively.

19. A non-transitory computer readable medium storing a program for causing a computer to execute a predetermined operation, the program comprising the step of:
performing an image enhancement processing to enhance or de-enhance a predetermined bandwidth of a right eye image displayed to a right eye and a left eye image displayed to a left eye image from an input image,
wherein, in the step of performing the image enhancement processing, a difference in an amount of enhancement between the right eye image and the left eye image is set to be equal to or more than a perceptible limit, the perceptible limit being a limiting point where a difference of sharpness can be discriminated by perception, and the amount of enhancement of the bandwidth enhancement processing is fluctuated with time.

20. A non-transitory computer readable medium storing a program for causing a computer to execute a predetermined operation, the program
causing the computer to execute processing including:
acquiring, by one of a right eye image acquiring means and a left eye image acquiring means, an input image as a display image; and
acquiring, by the other of the right eye image acquiring means and the left eye image acquiring means, a display image by performing black and white reversal or color reversal of the input image acquired by the one of the right eye image acquiring means and the left eye image acquiring means.

* * * * *